(12) United States Patent
Qadri et al.

(10) Patent No.: US 10,662,062 B2
(45) Date of Patent: *May 26, 2020

(54) NANOSTRUCTURED SILICON NITRIDE SYNTHESIS FROM AGRICULTURE WASTE

(71) Applicant: The Government of the United States of America, as represented by the Secretary of the Navy, Arlington, VA (US)

(72) Inventors: Syed B. Qadri, Fairfax Station, VA (US); Bhakta B. Rath, Oakton, VA (US); Edward P. Gorzkowski, III, Odenton, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,187

(22) Filed: Feb. 4, 2019

(65) Prior Publication Data

US 2019/0169028 A1    Jun. 6, 2019

Related U.S. Application Data

(63) Continuation of application No. 15/606,425, filed on May 26, 2017, now Pat. No. 10,239,757.
(60) Provisional application No. 62/351,519, filed on Jun. 17, 2016, provisional application No. 62/351,066, filed on Jun. 16, 2016.

(51) Int. Cl.
*C01B 21/068* (2006.01)

(52) U.S. Cl.
CPC ...... *C01B 21/0685* (2013.01); *C01P 2002/72* (2013.01); *C01P 2002/82* (2013.01); *C01P 2004/03* (2013.01); *C01P 2004/04* (2013.01); *C01P 2004/13* (2013.01); *C01P 2004/16* (2013.01)

(58) Field of Classification Search
None
See application file for complete search history.

(56) References Cited

PUBLICATIONS

Chen et al.; Co-Catalyzed Nitridation of Silicon and In-Situ Growth of α-Si3N4 Nanorods; Ceramic International; 40, 11063-11070; 2014.*

Du et al.; Simultaneous Growth of alpha-Si3N4 and beta-SiC Nanorods; Materials Research Bulletin; 36, 847-852; 2001.*

* cited by examiner

*Primary Examiner* — Guinever S Gregorio
(74) *Attorney, Agent, or Firm* — US Naval Research Laboratory; Stephen T. Hunnius

(57) ABSTRACT

$Si_3N_4$ nanotubes and nanorods wherein the nanotubes and nanorods of silicon nitride are pure $\alpha\text{-}Si_3N_4$ formed by carbothermal reduction of $SiO_2$ from reacting agricultural husk material in heat and forming the silicon nitride nanotubes and nanorods.

2 Claims, 7 Drawing Sheets

NANOSTRUCTURED SILICON NITRIDE SYNTHESIS FROM AGRICULTURE WASTE

REFERENCE TO RELATED APPLICATION

This application is a non-provisional of, and claims priority to and the benefits of, U.S. patent application Ser. No. 15/606,425 filed on May 26, 2017 and U.S. Patent Application No. 62/351,066 filed on Jun. 16, 2016 and U.S. Patent Application No. 62/351,519 filed on Jun. 17, 2016, the entirety of each is hereby incorporated by reference.

BACKGROUND

A method of making $Si_3N_4$ is disclosed herein involving adding agricultural husk material powder to a container, applying heat, and forming silicon nitride, wherein the silicon nitride is nanotubes and nanorods.

Silicon nitride, SiN, is an advanced ceramic material that has been in existence for many years but is finding important technological applications at extreme temperatures because of its high hardness, thermal conductivity, and resistance to erosion, corrosion and oxidation. SiN is also included among the family of reinforcement materials in metal matrix composites such as aluminum.

Indeed, components fabricated from SiC materials have surfaces that come close to the hardness of diamonds and possess excellent resistance to abrasion.

Nanocrystalline materials have mechanical properties that are largely governed by their ultimate sizes due to their large surface areas where most of the atoms are localized. Here, nanocrytalline/nanorods composites are produced that are superhard materials which will have promise for applications in the emerging field of miniaturized moving parts in microelectro-mechanical systems.

Silicon Nitride ($Si_3N_4$) is an important ceramic material for many technological applications due to its combination of exceptional physical, mechanical and electrical properties. Some of its unique mechanical properties include low density, high temperature strength, high hardness, excellent resistance to erosion, good fracture toughness, mechanical fatigue and creep resistance, and good corrosion and oxidation resistance.

In addition to mechanical properties, $Si_3N_4$ is a wide gap semiconductor and is used in electronics applications as an insulator and chemical barrier in integrated circuits. When used as a passivation layer for microchips, it acts as a diffusion barrier against water molecules and sodium ions and thus prevents corrosion in microelectronics.

Other electronic applications of silicon nitride are found in xerographic processes, as an ignition source for domestic gas appliances, and as cantilevers in atomic force microscopes.

Wheat and rice are major agricultural crops which results in millions of tons of wheat and rice husks being produced as byproducts during the milling process and provide abundant renewable sources for a combination of carbonaceous and silica matter. The chemical compositions of the wheat and rice husks consist of high levels of silica content and organic (carbon) matter. The silica is present either in the amorphous or the crystalline phase. We have shown the formation of SiC nanoparticles, nanowires, nanorods or spherical colloids, through high temperature treatment in argon atmosphere or vacuum of wheat and rice husks, sorghum leaves, corn residues and/or the combination of carbon species, such as nanotubes, with silicate-containing species. It has been demonstrated that nanostructured silicon carbide results from the reaction between carbon and silica, intimately dispersed in these biomasses, when they go through carbothermal reaction in an inert atmosphere of argon or vacuum.

In this teaching, we will present results showing the formation of the α-phase of $Si_3N_4$ by carbothermal reduction of $SiO_2$ in the presence of a nitrogen atmosphere in one-step process. The transmission electron microcroscopy and scanning electron microscopy results indicate the formation of nanostructures such as nanorods, nanotubues and nanoparticles of $Si_3N_4$. Moreover, in a two-step process in which SiC was produced from either rice or wheat husk and followed by treating in nitrogen at 1450 C, our results show that the processed sample results in a composite having α- and β-phases of $Si_3N_4$ and the cubic phase of SiC.

SUMMARY OF DISCLOSURE

Description

This disclosure pertains to a method of making $Si_3N_4$ nanotubes and nanorods involving adding agricultural husk material powder to a container, applying heat, and forming the silicon nitride nanotubes and nanorods.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION OF THE INVENTION

We teach here a method of making $Si_3N_4$ nanotubes and nanorods involving adding agricultural husk material powder to a container, applying heat, and forming the silicon nitride nanotubes and nanorods.

One embodiment can include the formation of abundant quantities of $Si_3N_4$ from rice and wheat husks using a conventional furnace in a nitrogen atmosphere or using microwave processing.

The nanoparticles and rods of $Si_3N_4$ are produced in abundant quantities in a pure form using an inexpensive processing of agriculture waste.

Another embodiment can include a method of making $Si_3N_4$ comprising adding agricultural husk material powder to a container, wherein the container is a covered boron nitride crucible, creating an inert atmosphere of nitrogen inside the container, applying heat, heating the agricultural husk material, and reacting the agricultural husk material and forming silicon nitride, wherein the silicon nitride is nanotubes and nanorods.

Example 1

As-prepared samples were made from raw wheat and rice husks after thoroughly washing them in distilled water. The husks were pulverized into powder using a SPEX 8000M high energy mill with stainless steel milling media. Pellet samples of 1 cm diameter were prepared by pressing the powdered samples using a Carver press and homemade die set.

Example 2

The pellet samples prepared from the powdered wheat or rice husks were subjected to pressures in excess of 1.7 GPa in a hydraulic press using a 1 cm diameter die. In order to determine the amount of $SiO_2$ present in wheat and rice husks, the samples were heat-treated in air at 800° C.

By weighing the wheat and husk samples before and after heat treatment in air and using x-ray diffraction scans, the presence of crystalline phases of $SiO_2$ was found to have a weight percentage of 16% for the rice husk and 14% for the wheat husks.

Example 3

We have demonstrated the formation of nanostructured SiC from both rice and wheat samples when treated in argon atmosphere or vacuum. In order to explore the effect of heat treatment in the presence of $N_2$ atmosphere, the samples of rice and wheat husks were treated for two hours at temperatures ranging from 1300° C. to 1500° C.

Figure 1:
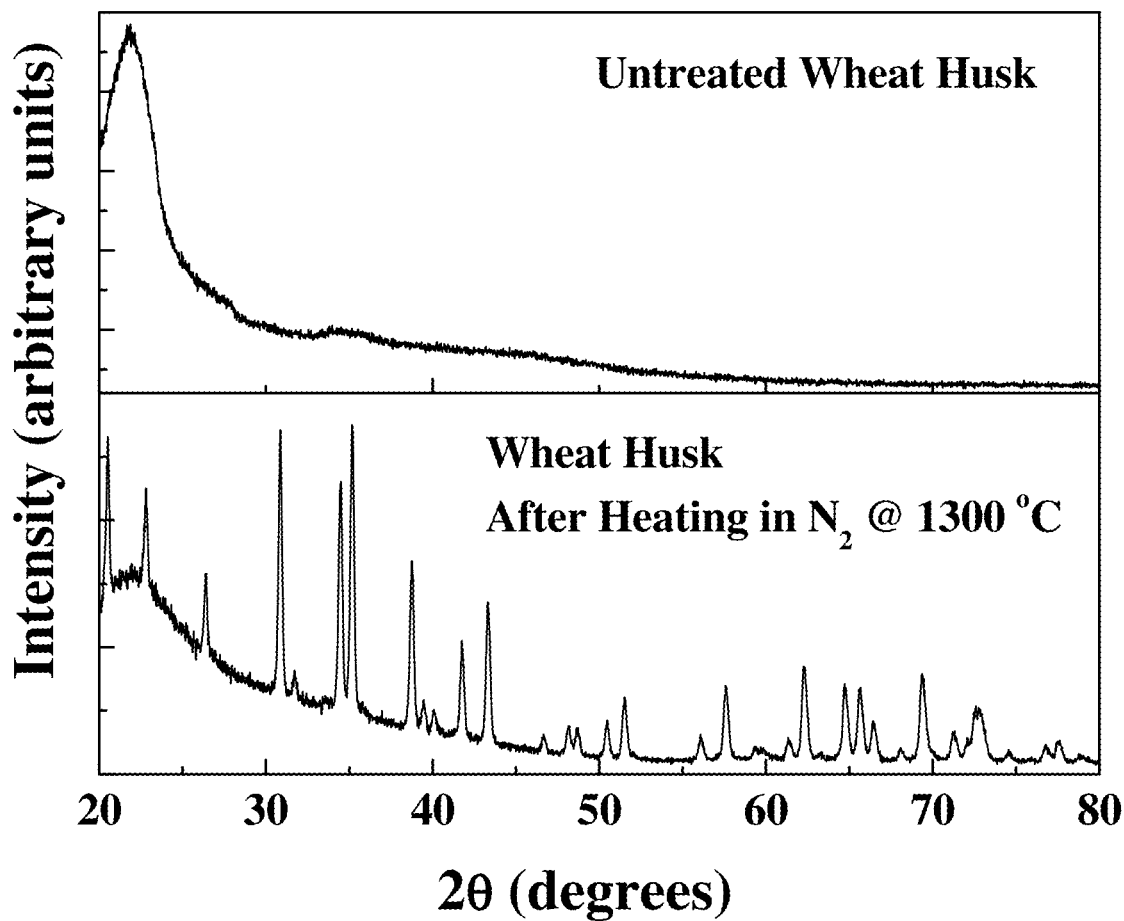
FIG. 1 illustrates X-ray diffraction patterns taken with CuKα radiation of as-received wheat husk and a sample prepared in $N_2$ atmosphere at 1300° C. showing only the presence of α-phase of $Si_3N_4$.
Figure 2:
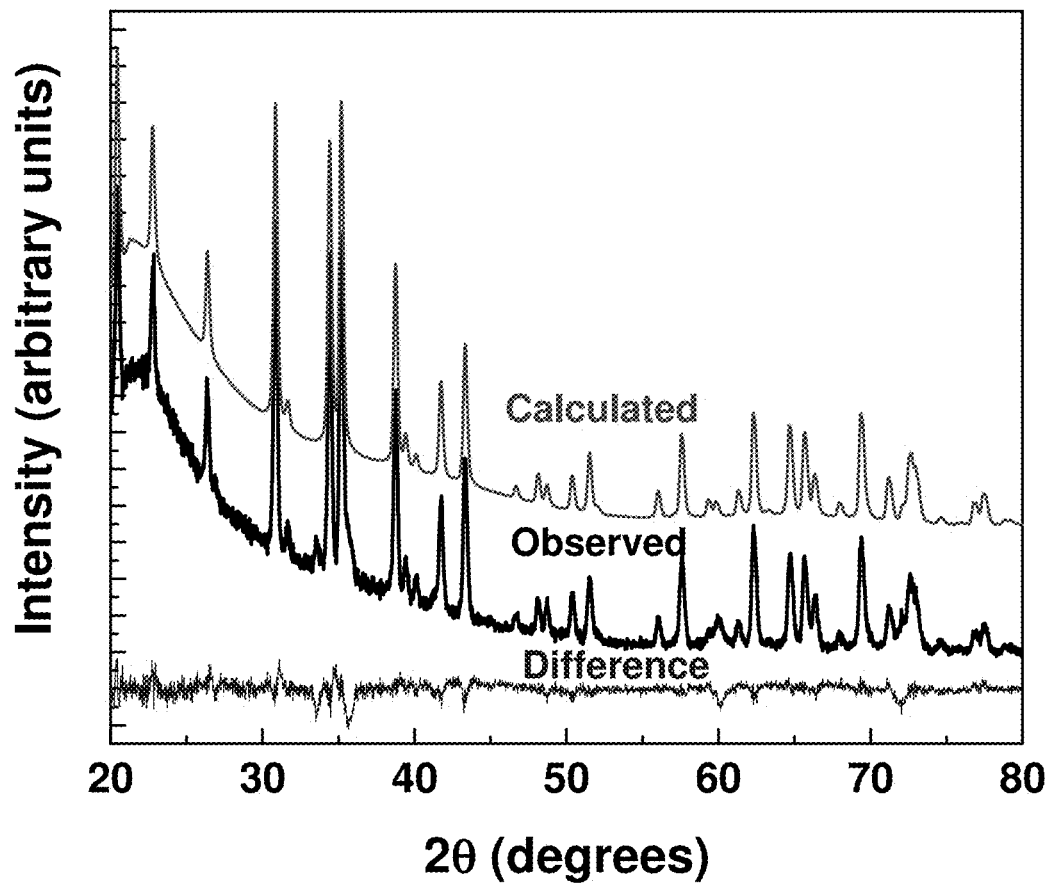
FIG. 2 illustrates a Rietveld whole profile analysis of the diffraction pattern for wheat husk sample prepared in $N_2$ atmosphere at 1300° C. The observed and calculated patterns are displaced from each other to show a comparison between observed and calculated intensities. The difference between observed and calculated intensities is also given at the bottom. Only the α-phase of $Si_3N_4$ was present.

After the heat treatment in $N_2$ atmosphere, the samples were treated in air at 800° C. to remove the excess unreacted excess carbon. FIG. 1 shows x-ray diffraction scans of the as-prepared compacts made from wheat husk prior to any heat treatment and after heat treatment in $N_2$ atmosphere at 1300° C. The as-prepared sample scan shows the presence of only amorphous material whereas the heat treated sample in nitrogen shows formation of the α-crystalline phase of $Si_3N_4$. A Rietveld analysis of the diffraction scan of the sample processed in $N_2$ gave us an R-factor of 4%. The lattice parameters, crystallite sizes and the structural parameters of the α-phase of $Si_3N_4$ are given in Table I.

TABLE I

Structural Parameters, lattice parameters and Crystallite size for wheat husk sample treated in $N_2$ gas at 1300° C.

| α-phase | ID | Site | Fill | x | y | z |
|---|---|---|---|---|---|---|
| | N | 2 | 1 | 0 | 0 | 0.4502 |
| | N | 2 | 1 | 1/3 | 2/3 | 0.5990 |
| | N | 6 | 1 | 0.654 | 0.611 | 0.4301 |
| | N | 6 | 1 | 0.316 | 0.319 | 0.6974 |
| | Si | 6 | 1 | 0.082 | 0.512 | 0.6578 |
| | Si | 6 | 1 | 0.254 | 0.167 | 0.4509 |

Space group P31c (159);
a = 7.7744 Å;
c = 5.6249Å;
α = 90;
β = 90;
γ = 120;
Crsyt. Size = 40 (1.1) nm

Example 4

Figure 4:
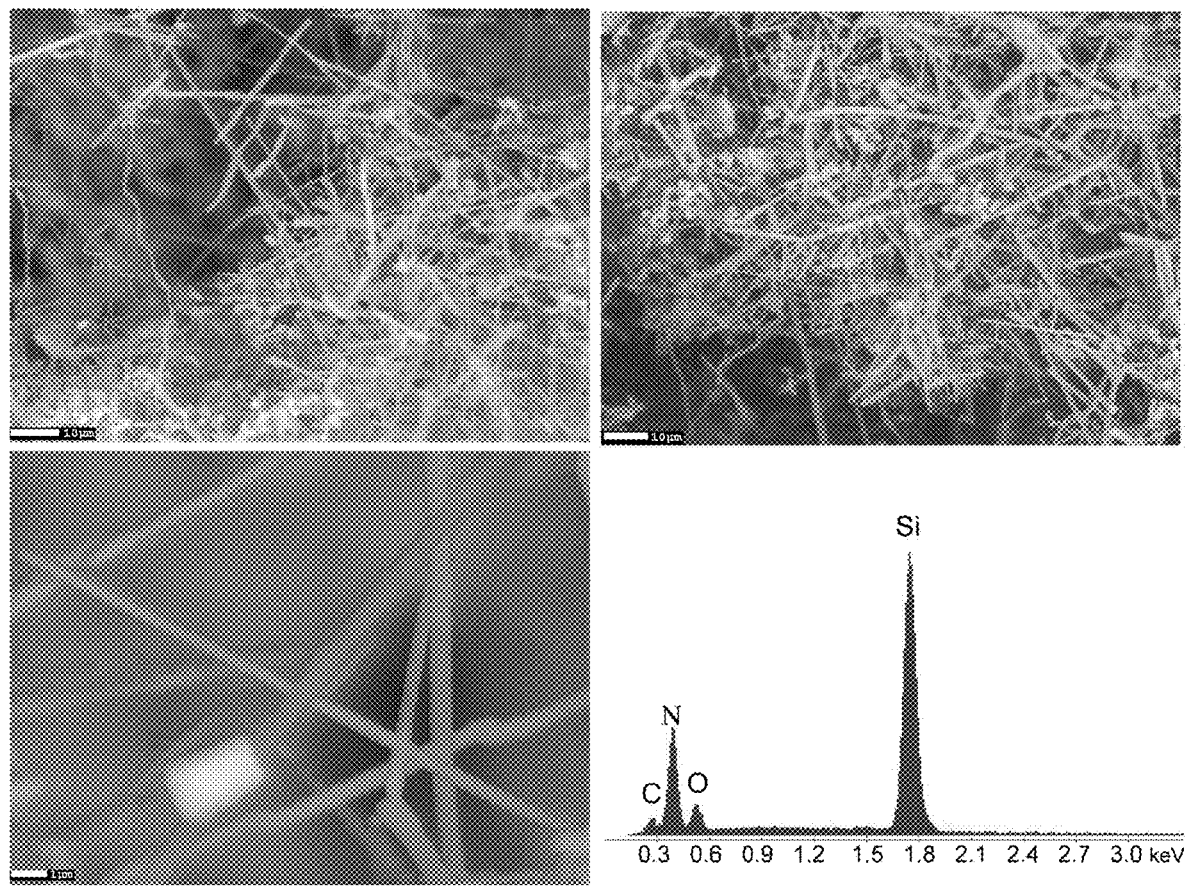
FIG. 4 illustrates SEM micrographs of the wheat husk sample processed at 1450° C. in nitrogen atmosphere showing $Si_3N_4$ rod structure. Energy dispersive x-ray spectrum is also shown.

The scanning electron micrographs of the as-processed wheat husk sample prepared at 1300° C. are shown in FIG. 4 along with energy dispersive x-ray spectrum (EDS). Clearly the EDS spectrum shows Si and N elements and trace amount of C, which comes from the carbon tape used to mount the sample.

The microstructure shows the formation of rod-like structures of $Si_3N_4$. The diameters of these rods were between 0.1 μm to 0.5 μm with their lengths being of the order of several microns.

Figure 5:
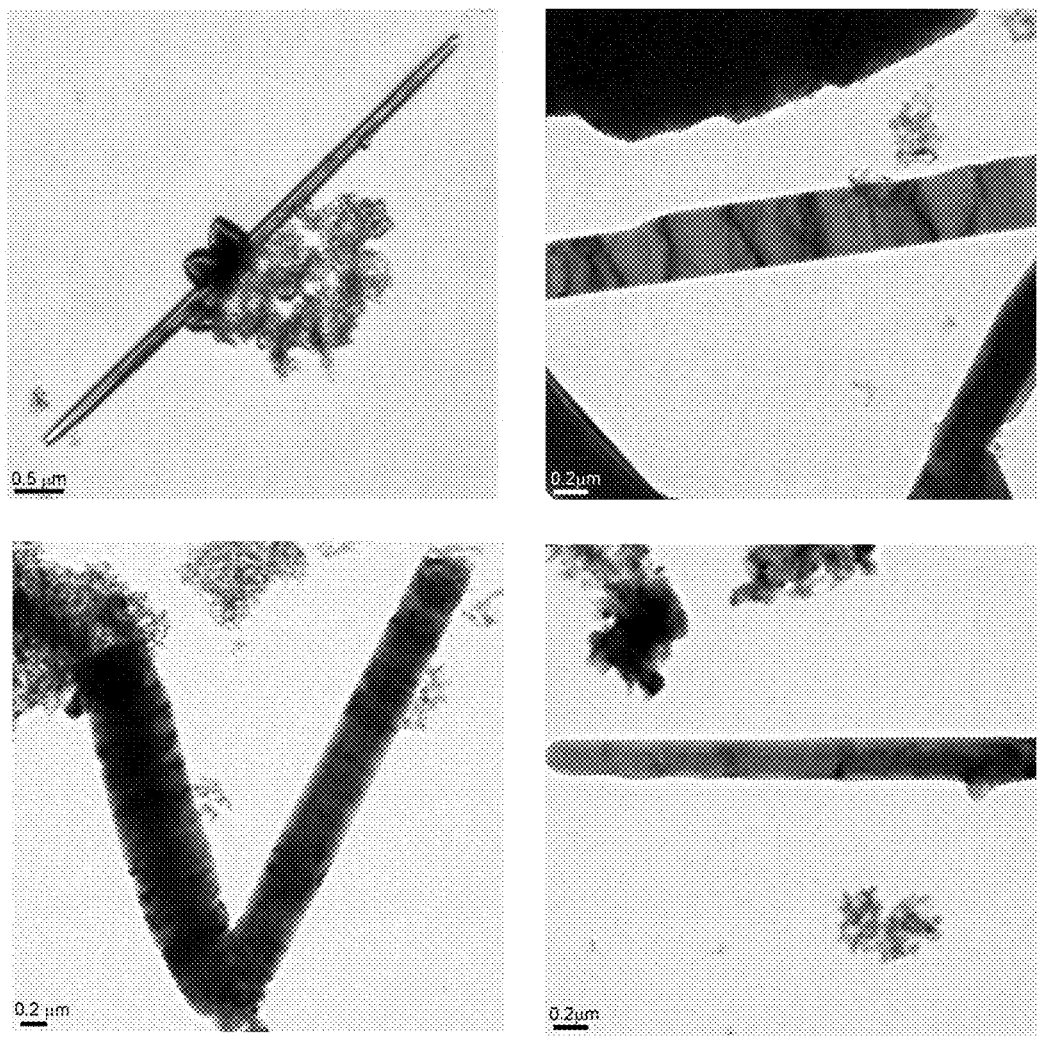
FIG. 5 illustrates TEM micrographs of the wheat husk sample processed at 1450° C. in nitrogen atmosphere showing $Si_3N_4$ rod-like structures and tubes along with nanoparticles of $Si_3N_4$. The rod-like structures show stacking faults.
Figure 6:
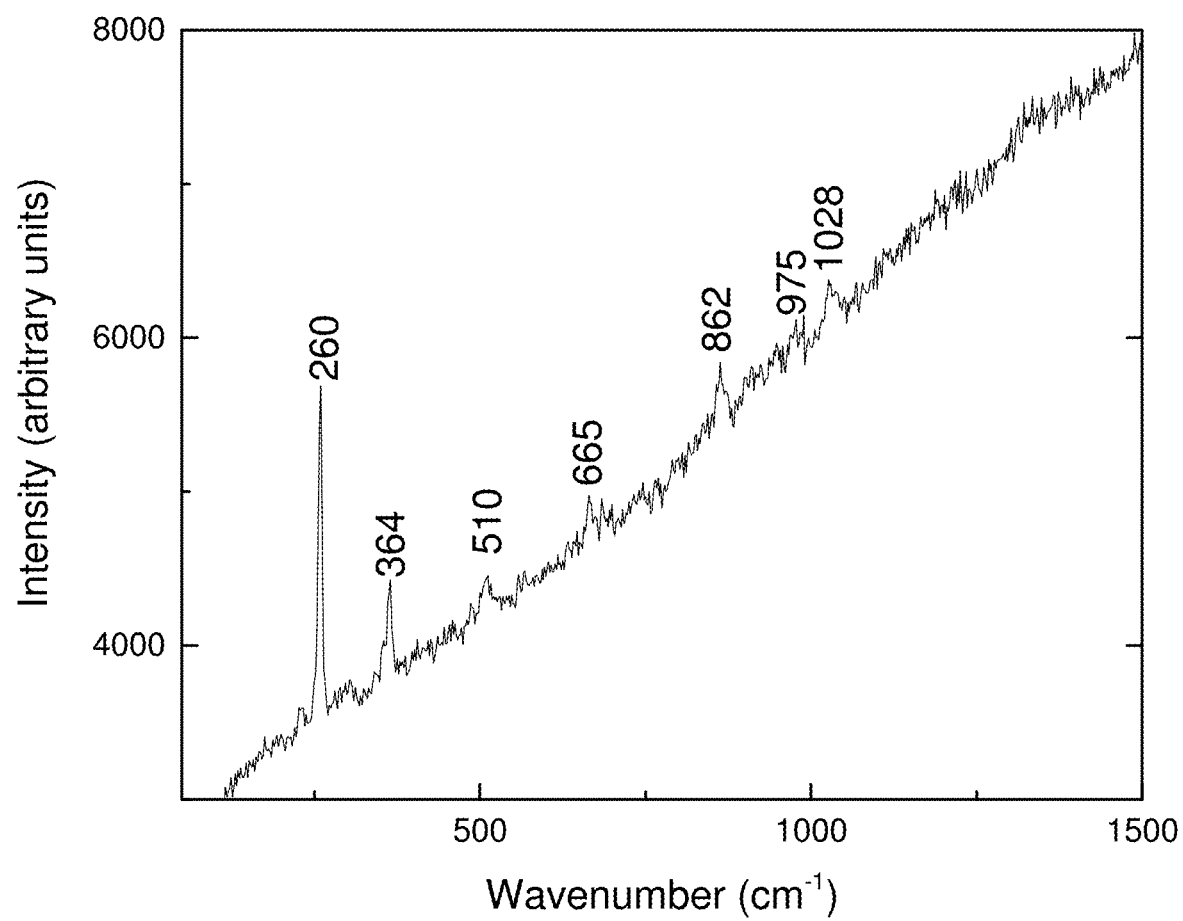
FIG. 6 illustrates Raman Spectra of the wheat husk sample processed at 1450° C. in nitrogen atmosphere confirming the peaks consistent with α-phase of $Si_3N_4$.

FIG. 5 demonstrates the formation of tubes and rods of $Si_3N_4$.

In this figure formation of stacking faults is also seen. The average diameters are of the order of about 0.2 μm and the lengths extending to several microns.

Example 5

Figure 3:
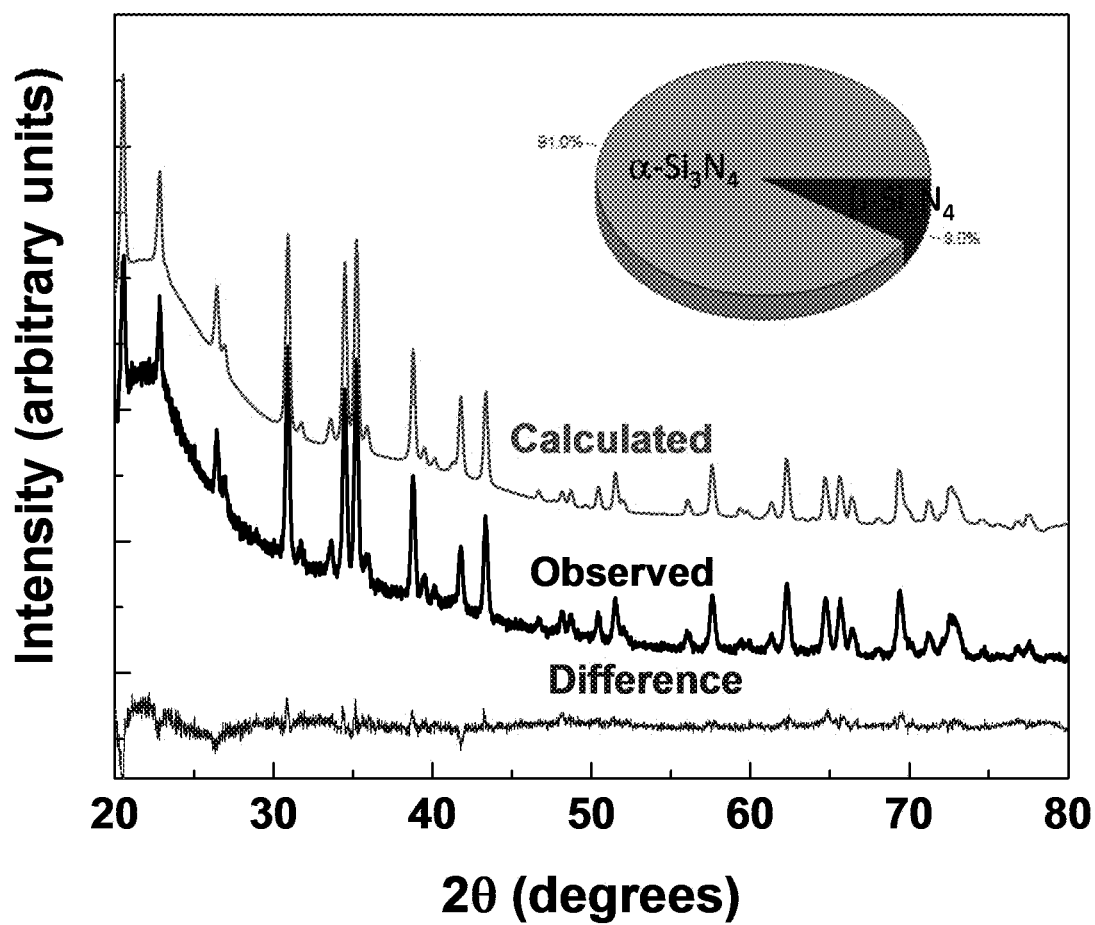
FIG. 3 illustrates a Rietveld whole profile analysis of the diffraction pattern for wheat husk sample prepared in $N_2$ atmosphere at 1500° C. Both α- and β-phases are present. The quantitative analysis is given in the inset.

In order to confirm the formation of α-phase of $Si_3N_4$, Raman spectroscopy was performed. FIG. 3 shows the Raman spectra for the wheat husk sample fired at 1300° C. in nitrogen atmosphere showing the characteristic peaks for α-phase of $Si_3N_4$. The dominant lines observed at 260, 510, 665, 862, 975 and 1028 cm' are consistent with Raman-active modes of alpha silicon nitride observed by Kuzuba et al.

Another embodiment includes the following. As-prepared samples were made from raw wheat and rice husks after thoroughly washing them in distilled water. The husks were pulverized into powder using a SPEX 8000M high energy mill with stainless steel milling media. Pellet samples of 1 cm diameter were prepared by pressing the powdered samples using a Carver press and homemade die set. The samples of raw husks and their pellets were heated in a Nitrogen atmosphere using a conventional furnace to a temperature between 1300-1500° C.

Example 6

Following the thermal treatment, the processed samples were characterized using x-ray diffraction, Raman spectroscopy and electron microscopy techniques. X-ray diffraction scans were collected using a Rigaku 18 kW generator and a high resolution powder diffractometer. Monochromatic CuKα radiation was used for all x-ray diffraction measurements, while scanning electron microscopy of the nanostructures was performed using a JEOL JSM-7001FLV SEM. For TEM analysis, the sample powder was added to ethyl alcohol and the mixture was placed in the ultrasonic cleaner for a period of time. A carbon coated 200 mesh copper grid was immersed in the mixture to pick up the $Si_3N_4$ powder samples. The specimens were examined in a FEI Tecnai G2 TEM operated at 300 kV.

TABLE II

Structural Parameters, lattice parameters and Crystallite sizes for wheat husk sample treated in $N_2$ gas at 1450° C.

| ID | Site | Fill | x | y | z |
|---|---|---|---|---|---|
| α-phase | | | | | |
| N | 2 | 1 | 0 | 0 | 1/2 |
| N | 2 | 1 | 1/3 | 2/3 | 0.630 |
| N | 6 | 1 | 0.653 | 0.612 | 0.453 |
| N | 6 | 1 | 0.316 | 0.319 | 0.721 |
| Si | 6 | 1 | 0.078 | 0.507 | 0.676 |
| Si | 6 | 1 | 0.253 | 0.168 | 0.460 |
| Space group P31c (159); a = 7.7764 Å; c = 5.6308 Å; α = 90; β = 90; γ = 120; Crsyt. Size = 45.8 nm | | | | | |
| β-phase | | | | | |
| Si | 6 | 1 | 0.231 | 0.231 | 0.013 |
| N | 6 | 1 | 0.328 | 0.328 | 0.050 |
| N | 2 | 1 | 1/3 | 1/3 | 0 |
| Space group P63 (173); a = 7.6361 Å; c = 2.9119 Å; α = 90; β = 90; γ = 120; Crsyt. Size = 35.4 nm | | | | | |

Figure 7:
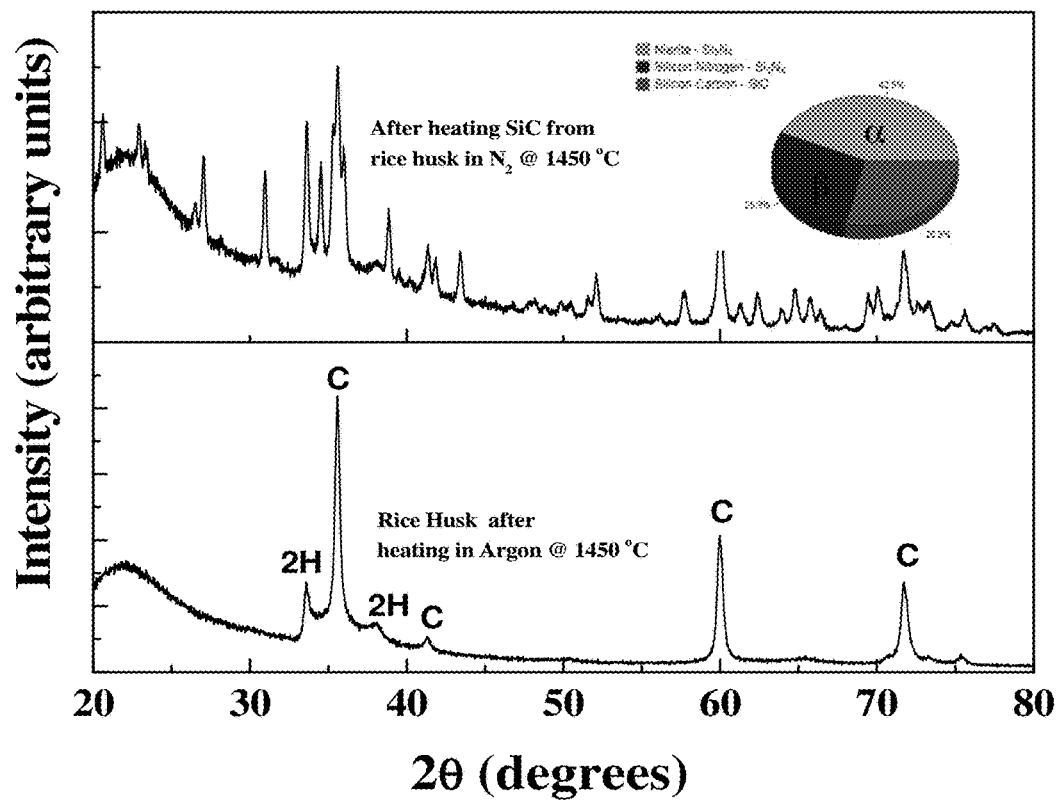
FIG. 7 illustrates X-ray diffraction patterns taken with CuKα radiation of SiC prepared from as-received rice husk sample in Argon at 1450° C. and then heat treated in $N_2$ atmosphere at 1450° C. showing the presence of α- and β-phase of $Si_3N_4$ along with the cubic phase of SiC. The quantitative analysis of the phases is shown in a pie chart shown as an inset.

In our two-step process involving an initial formation of SiC by heat treatment of wheat husk or rice husk in Ar atmosphere at 1400° C. and then a secondary heat treatment in $N_2$ gas at the same temperature with equal treatment for periods of two hours, both α- and β-phases of $Si_3N_4$ were formed from SiC. FIG. 7 shows an overlay of x-ray diffraction before and after treating in nitrogen atmosphere. As produced SiC from wheat husk consists of cubic 3C and a minor hexagonal 2H phase. After heating in a nitrogen atmosphere, peaks from cubic 3C phase, α- and β-phases of $Si_3N_4$ are observed. The whole profile Rietveld analysis shows a composite that consists of 42.8% of α-phase, 28.9% of β-phase and 28.3% of SiC.

The thermal process involved in the formation of SiC or nanoparticles and nanowires/nanorods has been demonstrated. During the pyrolysis, the organic matter contained in the agriculture waste decomposes into amorphous carbon. At temperatures above 1300° C. in an inert atmosphere of Argon or vacuum, the carbon reacts with $SiO_2$ which is inherently present either in the amorphous or crystalline state according to the carbo-thermal reduction: $SiO_2+3C=SiC+2CO$. However, in the presence of a $N_2$ atmosphere, the reaction proceeds as $3SiO_2+6C+2N_2 \rightarrow Si_3N_4+6CO$, which leads to the formation of $Si_3N_4$ phases.

There are well-known crystalline phases of silicon nitride, α and β and both have hexagonal symmetry. The unit cell of the α-phase is twice as large as the unit cell of β-phase and differs in the stacking sequence. At high temperature of 1723° C., the α-phase transforms to β-phase, which is more favorable energetically, in a first-order irreversible transformation. Once transformed to the β-phase it remains in that phase. The unit cell of α-phase consists of 4 formula units or 28 atoms with lattice parameters of a=7.75 Å and c=5.62 Å, whereas the β-phase consists of 2 formula units or 14 atoms with lattice parameters of a=7.71 Å and c=2.91 Å.

$Si_3N_4$ has two stable polymorphs, α- and β, where the β configuration is the more stable of the two. Both have hexagonal lattices and only differ along the z-axis in the stacking sequence. The α-phase is the low temperature polymorph whereas the β is the high temperature polymorph. In a solid state phase transformations, there are two exchange energies involved; the liberated free energy of the new phase (which is less than the free energy of the old phase) and the surface energy to form the interface between the two phases. In our case, the crystallite sizes are in the 30-50 nm range which provides a large surface/interface area to volume ratio compare to a bulk sample of $Si_3N_4$ and encourages the reduction of the α-to-β transition temperature from 1723° C. to above 1400° C. This result is also consistent with what has been reported as a size-induced transition temperature reduction in nanoparticles of ZnS.

Nanoparticles and sub-micron diameter rods of α-$Si_3N_4$ are obtained from the wheat and rice husks by heat treatment in an atmosphere of $N_2$ at temperatures between 1300° C. to 1500° C. Samples prepared at 1300° C. showed only α-phase whereas the samples prepared at 1400° C. and 1500° C. showed trace amounts of high temperature β-phase. The samples prepared from the SiC produced from the rice husk and wheat husk and followed by heat treatment in $N_2$ atmosphere showed composite material consisting of α- and β-phases of $Si_3N_4$ and cubic phase of SiC. These nanostructures in different phases of $Si_3N_4$ and their composites with SiC will be very useful in a variety of applications in aerospace mechanical applications, and as dielectric materials for applications in nanoelectronics, nanosensors, and biotechnology.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What we claim is:

1. A $Si_3N_4$ nanotube and nanorod made from the steps of:
   adding agricultural husk material powder to a container;
     wherein the container is a covered boron nitride crucible;
   creating an inert atmosphere of nitrogen inside the container;
   applying heat;
   heating the agricultural husk material;
   heating the agricultural husk material to a temperature of about 1300-1500° C.; and
   reacting the agricultural husk material and forming silicon nitride;
     wherein the silicon nitride is nanorods with a diameter of 0.1 micron;
     wherein the nanorods of silicon nitride are pure α-$Si_3N_4$ formed by carbothermal reduction of $SiO_2$,
   cooling the silicon nitride nanorods to room temperature;

transferring the silicon nitride nanorods to an $Al_2O_3$ crucible; and heating the silicon nitride nanorods in the $Al_2O_3$ crucible in a furnace;

wherein the step of heating the silicon nitride nanorods in the $Al_2O_3$ crucible in a furnace is at 700° C. in $O_2$; and wherein the step of heating the silicon nitride nanorods in the $Al_2O_3$ crucible in a furnace at 700° C. in $O_2$ eliminates excess carbon via $O_2$ purification.

2. A $Si_3N_4$ nanotube and nanorod made from the steps of:

washing husks in distilled water;

pulverizing husks into fine husk powder using high energy mill with stainless steel milling media;

pressing the fine husk powder into pellets;

heating the pellets;

heating the pellet to a temperature of about 1300-1500° C.;

maintaining the temperature of the pellets at about 1300-1500° C.; and cooling the pellets comprising nanorods with a diameter of 0.1 micron and nanoparticles of silicon nitride;

wherein the nanorods of silicon nitride are pure $\alpha$-$Si_3N_4$ formed by carbothermal reduction of $SiO_2$ from reacting agricultural husk material in heat and forming the silicon nitride nanorods.

* * * * *